US012755087B2

(12) United States Patent
Buduguppa et al.

(10) Patent No.: US 12,755,087 B2
(45) Date of Patent: Oct. 6, 2026

(54) SYSTEMS AND METHODS RELATED TO ENTITY TAGGING OF IDENTIFIED PERSONAL INFORMATION IN CONTACT CENTER DATA

(71) Applicant: GENESYS CLOUD SERVICES, INC., Menlo Park, CA (US)

(72) Inventors: Pavan Buduguppa, Hyderabad (IN); Ramasubramanian Sundaram, Hyderabad (IN); Allwin Raju, Chennai (IN)

(73) Assignee: GENESYS CLOUD SERVICES, INC., Menlo Park, CA (US)

( * ) Notice: Subject to any disclaimer, the term of this patent is extended or adjusted under 35 U.S.C. 154(b) by 323 days.

(21) Appl. No.: 18/661,195

(22) Filed: May 10, 2024

(65) Prior Publication Data

US 2024/0378373 A1 Nov. 14, 2024

Related U.S. Application Data

(60) Provisional application No. 63/466,063, filed on May 12, 2023.

(51) Int. Cl.
*G06F 40/166* (2020.01)
*G06F 21/62* (2013.01)
(Continued)

(52) U.S. Cl.
CPC ........ *G06F 40/166* (2020.01); *G06F 21/6245* (2013.01); *G06F 40/117* (2020.01); *G06F 40/197* (2020.01); *G06F 40/295* (2020.01)

(58) Field of Classification Search
None
See application file for complete search history.

(56) References Cited

U.S. PATENT DOCUMENTS 10,534,931 B2 * 1/2020 Rogers, Jr. .......... H04L 63/0428
11,531,846 B1 * 12/2022 Bodapati ................ G06N 20/00
2021/0089620 A1 3/2021 Finkelshtein et al.

FOREIGN PATENT DOCUMENTS

WO 2021108454 A2 6/2021
WO 2021108454 A3 6/2021

OTHER PUBLICATIONS

International Search Report and Written Opinion from co-pending PCT application, having application No. PCT/US2024/029001, issued on Jul. 8, 2024.

* cited by examiner

*Primary Examiner* — Gabriel Mercado

(57) ABSTRACT

A method of extending a tagging and masking of recognized entities in a conversation transcript to cover new entity types. The method is performed in relation to the conversation transcript in accordance with parameters defining a new entity type. The method may include the steps of: searching for one of the keyword lookup trigger or the entity lookup trigger and triggering a lookup process in response to a detection thereof; performing the triggered lookup process by searching the search range specified in the received parameters for the selected generic entity type and detecting the selected generic entity type therein; revising the conversation transcript so that the entity name of the detected selected generic entity type is replaced with the entity name for the new entity type; and outputting a revised version of the conversation transcript that includes the revision.

20 Claims, 5 Drawing Sheets

(51) Int. Cl.

| | |
|---|---|
| ***G06F 40/117*** | (2020.01) |
| ***G06F 40/197*** | (2020.01) |
| ***G06F 40/295*** | (2020.01) |

500

SYSTEMS AND METHODS RELATED TO ENTITY TAGGING OF IDENTIFIED PERSONAL INFORMATION IN CONTACT CENTER DATA

CROSS REFERENCE TO RELATED APPLICATION

This application claims the benefit of U.S. Provisional Patent Application No. 63/466,063, titled "SYSTEMS AND METHODS RELATED TO ENTITY TAGGING OF IDENTIFIED PERSONAL INFORMATION IN CONTACT CENTER DATA", filed in the U.S.

Patent and Trademark Office on May 12, 2023, the contents of which are incorporated herein.

BACKGROUND

The present invention generally relates to telecommunications systems in the field of customer relations management including customer assistance via internet-based service options. More particularly, but not by way of limitation, the present invention pertains to systems and methods for systems and methods for tagging identified personal information in contact center data.

BRIEF DESCRIPTION OF THE INVENTION

The present invention describes a method of extending a tagging and masking of recognized entities in a conversation transcript to cover new entity types. The method includes the step of receiving a transcript from a conversation between participants that has been processed such that actual entities recognized therein have been replaced with respective entity names. Each entity name may be associated with an entity type, wherein the entity types include both specific entity types and generic entity types. The method further includes the step of receiving parameters defining a new entity type. The parameters may include: a lookup trigger parameter that specifies whether a lookup trigger for triggering a lookup process comprises a keyword lookup trigger or an entity lookup trigger; a keyword trigger parameter that, when the lookup trigger comprises the keyword lookup trigger, specifies one or more keywords that, when detected in the conversation transcript, triggers the lookup process; an entity trigger parameter that, when the lookup trigger comprises the entity lookup trigger, specifies a selected one of the specific entity types, which hereinafter is referred to as a selected specific entity type, that, when detected in the conversation transcript, triggers the lookup process; a lookup-entity parameter that specifies selected one of the generic entity types, which is hereafter referred to as a selected generic entity type, that, is searched for in the conversation transcript in response to the triggering of the lookup process; one or more search parameters that specify a search range within the conversation transcript for conducting the search for the selected generic entity type in performance of the lookup process; and an entity name parameter that specifies an entity name for the new entity type that is used to replace the selected generic entity type when detected during the lookup process. The method may further include the step of performing a first process in relation to the received conversation transcript in accordance with the received parameters defining the new entity type that includes: searching for one of the keyword lookup trigger or the entity lookup trigger and triggering a lookup process in response to a detection thereof; performing the triggered lookup process by searching the search range specified in the received parameters for the selected generic entity type and detecting the selected generic entity type therein; revising the conversation transcript so that the entity name of the detected selected generic entity type is replaced with the entity name for the new entity type; and outputting a revised version of the conversation transcript that includes the revision.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components, wherein.

DETAILED DESCRIPTION

Figure 1:
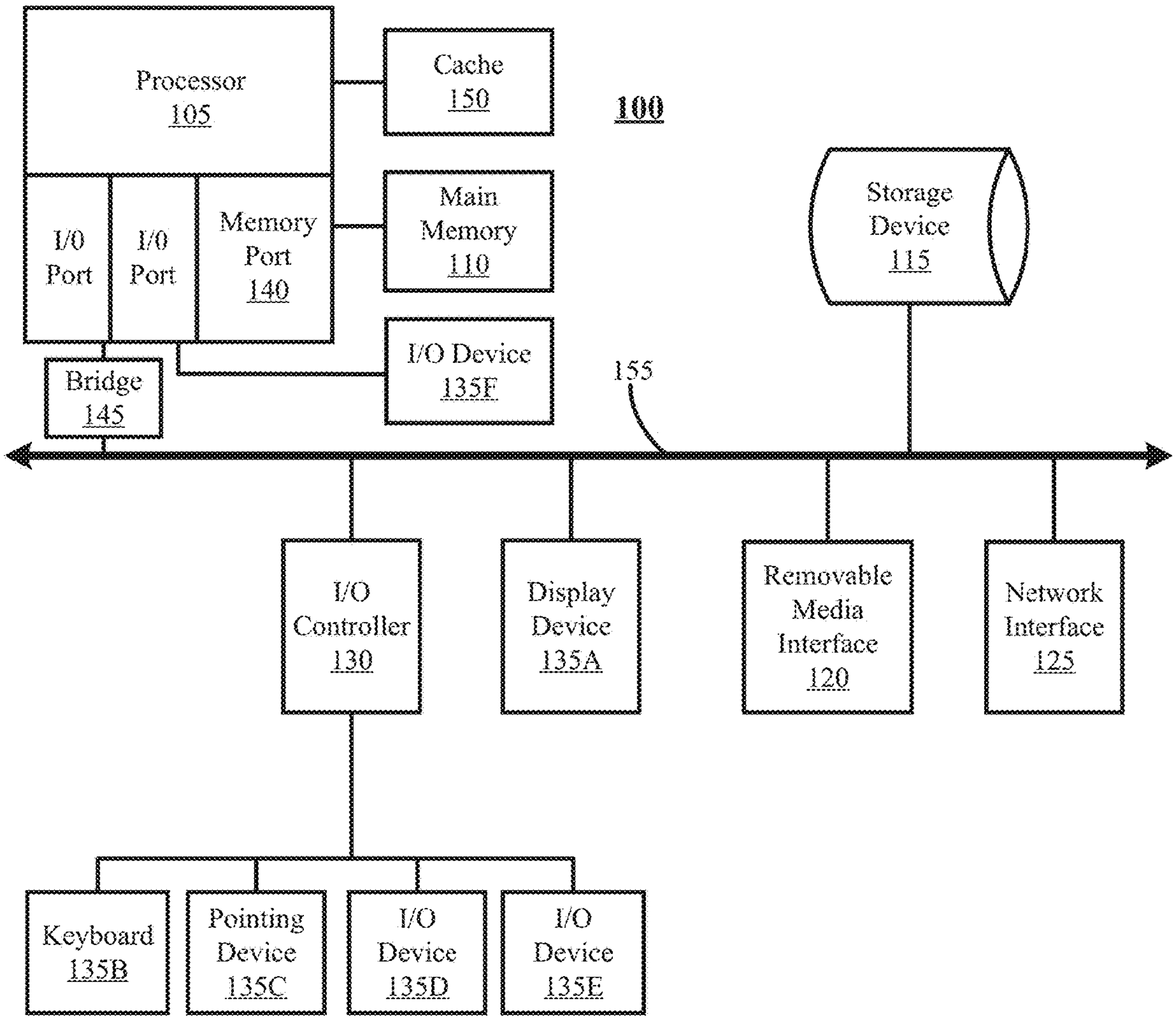
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art.

As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Thus, appearances of the phrases "an embodiment", "one embodiment", "present embodiments", "exemplary embodiments", "certain embodiments" and the like are not necessarily referring to the same embodiment or example. Further, particular features, structures or characteristics may be combined in any suitable combinations and/or sub-combinations in one or more embodiments or examples.

Those skilled in the art will recognize from the present disclosure that the various embodiments may be computer implemented using many different types of data processing equipment, with embodiments being implemented as an apparatus, method, or computer program product. Example embodiments, thus, may take the form of an entirely hardware embodiment, an entirely software embodiment, or an embodiment combining software and hardware aspects. Example embodiments further may take the form of a computer program product embodied by computer-usable program code in any tangible medium of expression. In each case, the example embodiment may be generally referred to as a "module", "system", or "method".

Computing Device

It will be appreciated that the systems and methods of the present invention may be computer implemented using many different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced. It should be understood that FIG. 1 is provided as a non-limiting example.

The computing device 100, for example, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described in the following figures—such as, for example, the contact center system 200 of FIG. 2—the various servers and computer devices thereof may be located on local computing devices 100 (i.e., on-site or at the same physical location as contact center agents), remote computing devices 100 (i.e., off-site or in a cloud computing environment, for example, in a remote data center connected to the contact center via a network), or some combination thereof. Functionality provided by servers located on off-site computing devices may be accessed and provided over a virtual private network (VPN), as if such servers were on-site, or the functionality may be provided using a software as a service (SaaS) accessed over the Internet using various protocols, such as by exchanging data via extensible markup language (XML), JSON, and the like.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The cache memory 150 typically has a faster response time than main memory 110. The main memory 110 may be one or more memory chips capable of storing data and allowing stored data to be directly accessed by the central processing unit 105. The storage device 115 may provide storage for an operating system, which controls scheduling tasks and access to system resources, and other software. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices, for example, may include a keyboard 135B and a pointing device 135C, e.g., a mouse or optical pen. Output devices, for example, may include video display devices, speakers, and printers. The I/O devices 135 and/or the I/O controller 130 may include suitable hardware and/or software for enabling the use of multiple display devices. The computing device 100 may also support one or more removable media interfaces 120, such as a disk drive, USB port, or any other device suitable for reading data from or writing data to computer readable media. More generally, the I/O devices 135 may include any conventional devices for performing the functionality described herein.

The computing device 100 may be any workstation, desktop computer, laptop or notebook computer, server machine, virtualized machine, mobile or smart phone, portable telecommunication device, media playing device, gaming system, mobile computing device, or any other type of computing, telecommunications or media device, without limitation, capable of performing the operations and functionality described herein. The computing device 100 include a plurality of devices connected by a network or connected to other systems and resources via a network. As used herein, a network includes one or more computing devices, machines, clients, client nodes, client machines, client computers, client devices, endpoints, or endpoint nodes in communication with one or more other computing devices, machines, clients, client nodes, client machines, client computers, client devices, endpoints, or endpoint nodes. It should be understood that, unless otherwise limited, the computing device 100 may communicate with other computing devices 100 via any type of network using any conventional communication protocol. Further, the network may be a virtual network environment where various network components are virtualized.

Contact Center

Figure 2:
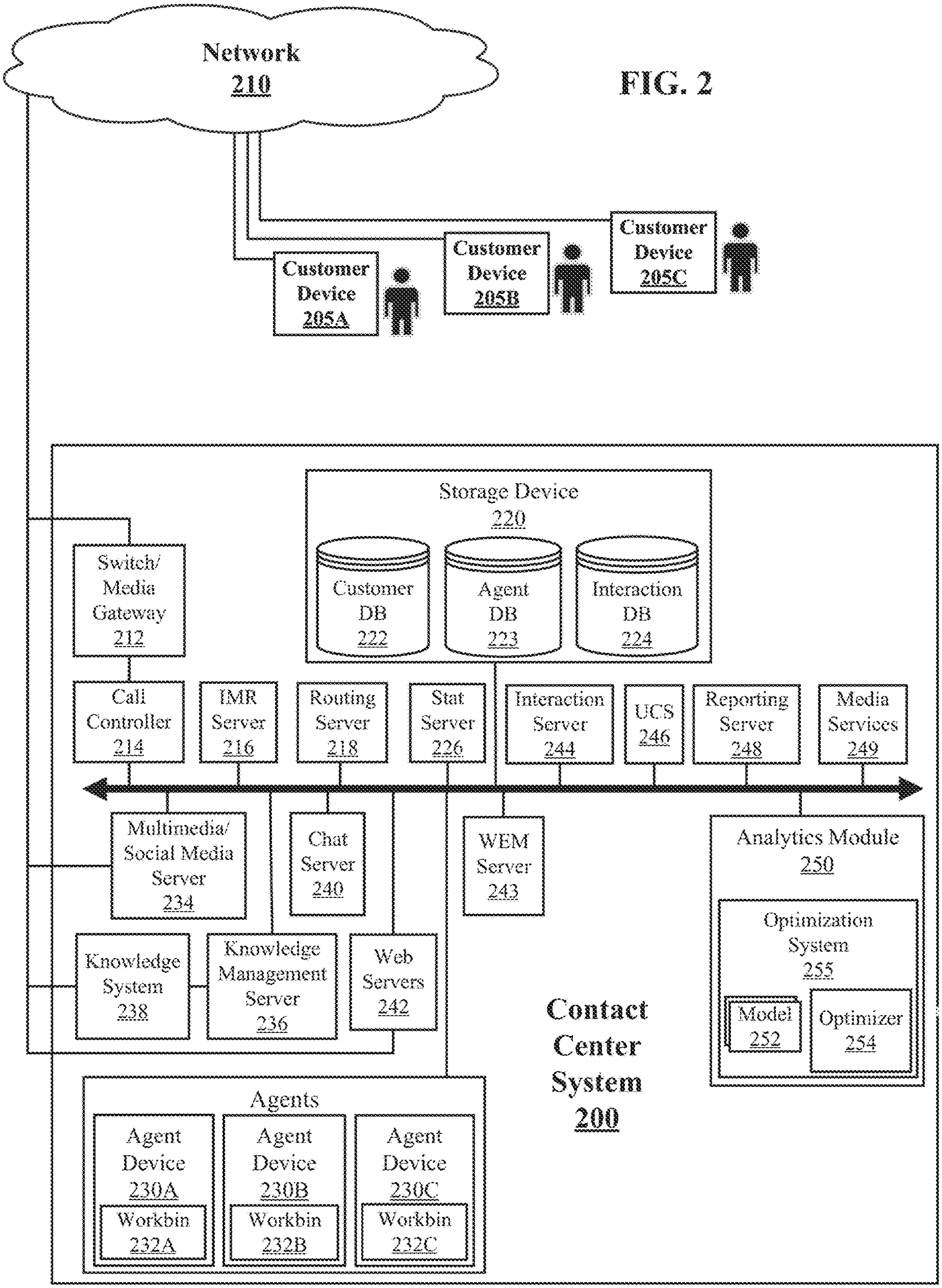
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system 200 is shown in accordance with exemplary embodiments of the present invention and/or with which exemplary embodiments of the present invention may be enabled or practiced. It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), as well as the organization or enterprise on behalf of which those customer services are being provided.

By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and the like.

Referring specifically to FIG. 2, the contact center system 200 may be used by a customer service provider to provide various types of services to customers. For example, the contact center system 200 may be used to engage and manage interactions in which automated processes (or bots) or human agents communicate with customers. As should be understood, the contact center system 200 may be an in-house facility to a business or enterprise for performing the functions of sales and customer service relative to products and services available through the enterprise. In another aspect, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment with infrastructure for supporting multiple contact centers for multiple enterprises. The contact center system 200 may include software applications or programs, which may be executed on premises or remotely or some combination thereof. It should further be appreciated that the various components of the contact center system 200 may be distributed across various geographic locations and not necessarily contained in a single location or computing environment.

It should further be understood that, unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with the illustrated example of FIG. 2, the components or modules of the contact center system 200 may include: a plurality of customer devices 205A, 205B, 205C; communications network (or simply "network") 210; switch/media gateway 212; call controller 214; interactive media response (IMR) server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; interaction (or "iXn") server 244; universal contact server (or "UCS") 246; reporting server 248; media services server 249; and analytics module 250. It should be understood that any of the computer-implemented components, modules, or servers described in relation to FIG. 2 or in any of the following figures may be implemented via types of computing devices, such as, for example, the computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like.

Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—it should be understood that any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, web-browsing sessions, and other multi-media transactions.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access (CDMA) network, global system for mobile communications (GSM) network, or any wireless network/technology conventional in the art, including but not limited to 3G, 4G, LTE, 5G, etc.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230.

As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, etc. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

In regard to the interactive media response (IMR) server 216, it may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource.

In regard to the routing server 218, it may function to route incoming interactions. For example, once it is determined that an inbound communication should be handled by a human agent, functionality within the routing server 218 may select the most appropriate agent and route the communication thereto. This agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer.

Regarding data storage, the contact center system 200 may include one or more mass storage devices—represented generally by the storage device 220—for storing data in one or more databases relevant to the functioning of the contact center. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therewithin or transmit data thereto for storage.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center 200 may be communication devices configured to interact with the various components and modules of the contact center system 200 in ways that facilitate functionality described herein. An agent device 230, for example, may include a telephone adapted for regular telephone calls or VoIP calls. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices—i.e., agent devices 230A, 230B and 230C—it should be understood that any number may be present.

In regard to the multimedia/social media server 234, it may be configured to facilitate media interactions (other than voice) with the customer devices 205 and/or the servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art. As an example, the knowledge system 238 may be embodied as IBM Watson or a like system.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the interaction (iXn) server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer.

In regard to the universal contact server (UCS) 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and the like.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed more below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach is presently a preferred embodiment for implementing the models 252. Neural networks, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer nonlinear programming, stochastic programming, global nonlinear programming, genetic algorithms, particle/swarm techniques, and the like.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

The various components, modules, and/or servers of FIG. 2 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact system 200 may be affected through user interfaces (UIs) which may be generated on the customer devices 205 and/or the agent devices 230. As already noted, the contact center system 200 may operate as a hybrid system in which some or all components are hosted remotely, such as in a cloud-based or cloud computing environment.

Entity Recognition and Tagging for PII Redaction/Masking

In a contact center, Named Entity Recognition (NER) has a host of uses. One of these is the identification of personally identifiable information (PII), which includes information that can be used to distinguish or trace an individual's identity either directly or indirectly through linkages with other information and/or information consistent with standards such as Payment Card Industry-Data Security Standard ("PCI-DSS"). Contact centers collect data from customers during interactions and, in using that data for a variety of reasons, have to identify such information so that it may be masked so to prevent disclosure. PII identification is one of the key aspects where NER is leveraged widely. Another use includes converting unstructured text into structured data. Other downstream uses As will be appreciated, the extent to which PII can be accurately identified and masked with specific labels significantly improves downstream uses of the data.

In general, NER is a subfield of natural language processing (NLP) that focuses on identifying and classifying specific data points from textual content. NER works with salient details of the text, known as named entities single words, phrases, or sequences of words by identifying and categorizing them into predefined groups or entity types. The categories encompass a diverse range of subjects present within the text, including individuals' names, geographic locations, organizational names, dates, events, and even specific quantitative values such as money and percentages.

Fundamentally, NER revolves around two primary steps: identifying entities within the text and categorizing these entities into distinct groups. Entity detection, often called mention detection or named entity identification, is the initial and fundamental phase in the NER process. It involves systematically scanning and identifying chunks of text that potentially represent meaningful entities. At its most basic, a document or sentence is just a long string of characters. Tokenization is the process of breaking this string into meaningful pieces called tokens. In English, tokens are often equivalent to words but can also represent punctuation or other symbols. That kind of segmentation simplifies the subsequent analytical steps by converting the text into manageable units. The next challenge is to understand the significance of these tokens. This is where feature extraction comes into play. It involves analyzing the properties of tokens, such as: morphological features that deal with the form of words, like their root forms or prefixes; syntactic features that focus on the arrangement and relationships of words in sentences; and semantic features that capture the inherent meaning of words and can sometimes tap into broader world knowledge or context to better understand a token's role.

The subsequent phase in the named entity recognition process, following entity detection, is entity classification. Entity classification involves assigning the identified entities to specific categories or classes based on their semantic significance and context. These categories—or entity types—can range from person and organization to location, date, and myriad other labels depending on the application's requirements. A nuanced process, entity classification demands a keen understanding of the context in which entities appear. This classification leverages linguistic, statistical, and sometimes domain-specific knowledge. For example, while "Apple" in a tech sphere might refer to the technology company, in a culinary context, it's more likely to mean the fruit. Such ambiguities in natural language often necessitate linguistic analysis or advanced NER models trained on extensive datasets to differentiate between possible meanings.

The method of performing NER has evolved significantly over the years, with multiple approaches being developed to tackle its challenges. Recently, NER has come to rely heavily on machine learning models. In the realm of traditional machine learning methods for NER, models are trained on data where entities are labeled. For instance, in the sentence "Paris is the capital of France," the words "Paris" and "France" could be labeled as geographical entities. Such methods heavily relies on feature engineering, where specific attributes and information about the data are manually extracted to improve the model's performance. The commonly engineered features include: word characteristics (details like word casing, prefixes, and suffixes); context (the surrounding words, whether preceding or succeeding, that offer clues); syntactic information (part-of-speech tags, which shed light on a word's function in a sentence, such as whether it's a noun, verb, adjective, etc.); word patterns (the shape or pattern of a word, especially for recognizing specific formats like dates or vehicle license numbers); and morphological details (information derived from the root form of a word or its morphological nuances). After the features are prepared, the model is trained on this enriched data. Common algorithms employed here include Support Vector Machines (SVM), Decision Trees, and Conditional Random Fields (CRF). Once trained, the model can then predict or annotate named entities in raw, unlabeled data.

An exemplary NER workflow may include the following. First, conversation transcripts are derived from agent-customer conversations. These may be derived from the text of agent-customer chats or ASR transcriptions of voice conversations. The conversation transcripts are sent to the NER System for processing.

Second, the NER System (i.e., trained model) then identifies named entities and then classifies those entities in accordance with several entity types. As an example, such entity types may include any of the following:

Entity Type—

- "GEO" Geographical locations and Addresses
- "PERSON" Proper names of people
- "PRICE" Currency or money
- "DATE" Dates
- "DATE_REL" Relative date entities like Tomorrow, Yesterday, etc.
- "ORG" Proper names of Organizations
- "TIME" Time entities, including approximate time, for example, morning, afternoon, evening, etc.
- "CARD_NUMBER" Debit or Credit card numbers
- "SSN" U.S. Social Security Numbers
- "PHONE_NUMBER" U.S. Phone numbers
- "ZIPCODE" U.S. postal zip codes
- "URL" Website or URLs
- "EMAIL" Email address
- "WORD_DIGIT_SEQ" Digits that are spelled out like "nineteen eighty seven"
- "MISC" Alphanumerics
- "DIGIT" Numerical values
- "NONE" Non-entity class
- "PRODUCT" Product or Brand names, like Apple or M&Ms
- "PII_OTHER" License plate numbers, account numbers, etc.
- "USER_INFO" Usernames and passwords
- "DICTATION" Spellout class of entity It may be noted that not all of these entities are PII/PCI-DSS sensitive information. Instead the above list is representative of the entity types that may be used in a contact center domain.

Third, once the entity type is identified, the task then becomes a matter of deciding if the entity type is PII or PCI-DSS information.

Fourth, if it is determined that the recognized entity belongs to the category of PII/PCI-DSS information, the associated words/tokens must then be redacted, i.e., masked.

Fifth, in such functionality, it is natural to have a set of generic entity types which can serve the purpose of capturing entity types that do not fall into any of the specific entity types. As provided in the list above, the generic entity types include “DIGIT”, “MISC”, and “WORD_DIGIT_SEQ”.

The need regularly arises to add new entity types to the above list. As an example, let’s assume that a new entity type is needed that is named “ACCOUNT_ID” and defined as a 10-digit number. There are two ways for accomplishing this, i.e., two ways of making a system capable of the achieving the identification and masking functionality described above in relation to this new entity type. In the first way, a regular expression encapsulating the associated pattern may be defined. In the second, the NER model may be retrained so that the model can identify instances of the new entity type. For example, the model used to predict entities, which may be referred to as non-deterministic entities, is trained with training utterances that are augmented with the new entity type. However, there are drawbacks associated with either of these conventional approaches. In regard to the former, someone needs to be familiar with each of the expressions in which the new entity type appears, which is rare. In regard to the second, a sufficiently large number of associated utterances needs to be generated so that the probabilistic model sufficiently learns the new entity type. As will be appreciated, this can be an expensive and time-consuming process. Moreover, new patterns can clash with existing ones. For example, a new 10-digit pattern may clash with the already existing deterministic entity type of say, “PHONE_NUMBER”, which also can potentially be a 10-digit number.

In accordance with the present disclosure, methods and systems are proposed to make named entity tagging and masking systems more efficient by making them efficiently extensible. In exemplary embodiments, this is accomplished via defined parameters that specify a search and lookup process. As will be seen, the method may be used to extend extending a tagging and masking of recognized entities in a conversation transcript to cover a new entity type. In such cases, the process may be initiated in relation to a transcript from a conversation between participants (e.g., a customer and agent) that has been processed such that the actual entities recognized therein (i.e., Apple, Mr. Smith, etc.) have been already replaced with respective entity names that already exist in associate with existing entity types. Such existing entity types, for example, the list provided above, may include both specific entity types and generic entity types, as described above.

In accordance with exemplary embodiments, the following parameters may be used to define the new entity type. Such parameters, for example, may be defined by input received from a user.

The first parameter that may be included is referred to herein as a “lookup trigger parameter”. The lookup trigger parameter specifies whether a lookup trigger for triggering a lookup process constitutes a keyword type, in which case it is referred to as a “keyword lookup trigger”, or an entity type, in which case it may be referred to as an “entity lookup trigger”.

The second parameter that may be included is referred to herein as a “keyword trigger parameter”. The keyword trigger parameter specifies one or more keywords that, when detected in a conversation transcript, triggers the lookup process. The keyword trigger parameter is used when the lookup trigger parameter specifies that the lookup trigger is a keyword lookup trigger. For example, for the exemplary new entity type of ACCOUNT_ID, a list of keywords may be included within this parameter, such as: “account id”, “accountid”, “account i d”, “account number”, “number of the account”, “number on the account”. Each time one of these keywords is found in the conversation transcript, a lookup process is triggered.

The third parameter that may be included is referred to herein as an “entity trigger parameter”. The entity trigger parameter specifies a selected one of the specific entity types (or “selected specific entity type”) that, when detected in a conversation transcript, triggers the lookup process. The entity trigger parameter is used when the lookup trigger parameter specifies that the lookup trigger is an entity lookup trigger. As an example, from the list above, the entity type of “CARD_NUMBER” may be specified by this parameter. Each time this entity type is found in the conversation transcript, a lookup process is triggered.

The fourth parameter that may be included is referred to herein as a “lookup-entity parameter”. The lookup-entity parameter specifies a selected one of the generic entity types (or “selected generic entity type”) that is searched for in the conversation transcript in response to the triggering of the lookup process. For example, the lookup-entity parameter may be one of the generic entity types in the list above, such as, “DIGIT”, “MISC”, and “WORD_DIGIT_SEQ”.

The fifth parameter that may be included is referred to herein as an “entity name parameter”. The entity name parameter specifies an entity name for the new entity type. The entity name is the identifier that is used to replace the first generic entity type when detected during the lookup process. For the exemplary new entity type, this parameter may be “ACCOUNT_ID” or some other similar variation.

The sixth parameter that may be included is referred to herein as a “number of lookup-entity parameter”. The number of lookup-entity parameter specifies the number of times that the selected generic entity type must repeat sequentially before the lookup entity is deemed to be detected when performing the lookup process. So, for example, if the new entity type ACCOUNT_ID is a 10 digit number, then this parameter may be set at 10 so that the “DIGIT” entity type is required to repeat 10 times before it is deemed as being detected.

Other parameters that may be included are one or more search parameters that specify a search range within the conversation transcript for conducting the search for the selected generic entity type when performing the lookup process. In certain embodiments, the one or more search parameters may include a “participant parameter” that specifies one or more of the participants of the conversation transcript for limiting the triggering of the lookup process to only instances when the detected lookup trigger is found in a turn associated with the specified one or more participants. As used herein, a “turn” refers to a speaking turn in which a participant speaks that occurs between turns where a different participant is speaking. As an example, this parameter may be specified as “internal” or “agent”, if it is desired to search only turns when the agent is speaking, or as “external” or “customer”, if it is desired to search only turns when the customer is speaking. This parameter can also be specified as both for searching turns when either is speaking.

The one or more search parameters may further include a “number of turns parameter” that specifies a number of turns that the search is limited to in performance of the lookup process. The number of turns that are specified, for example, 5 or 10 turns, as part of this parameter may be measured consecutively from the turn in which the lookup trigger is detected. The one or more search parameters may further include a “forward/backward search parameter” that specifies whether the number of turns specified in the number of turns parameter is measured forward, backward, or both forward and backward in the conversation transcript relative to the turn in which the lookup trigger is detected.

Figure 3:
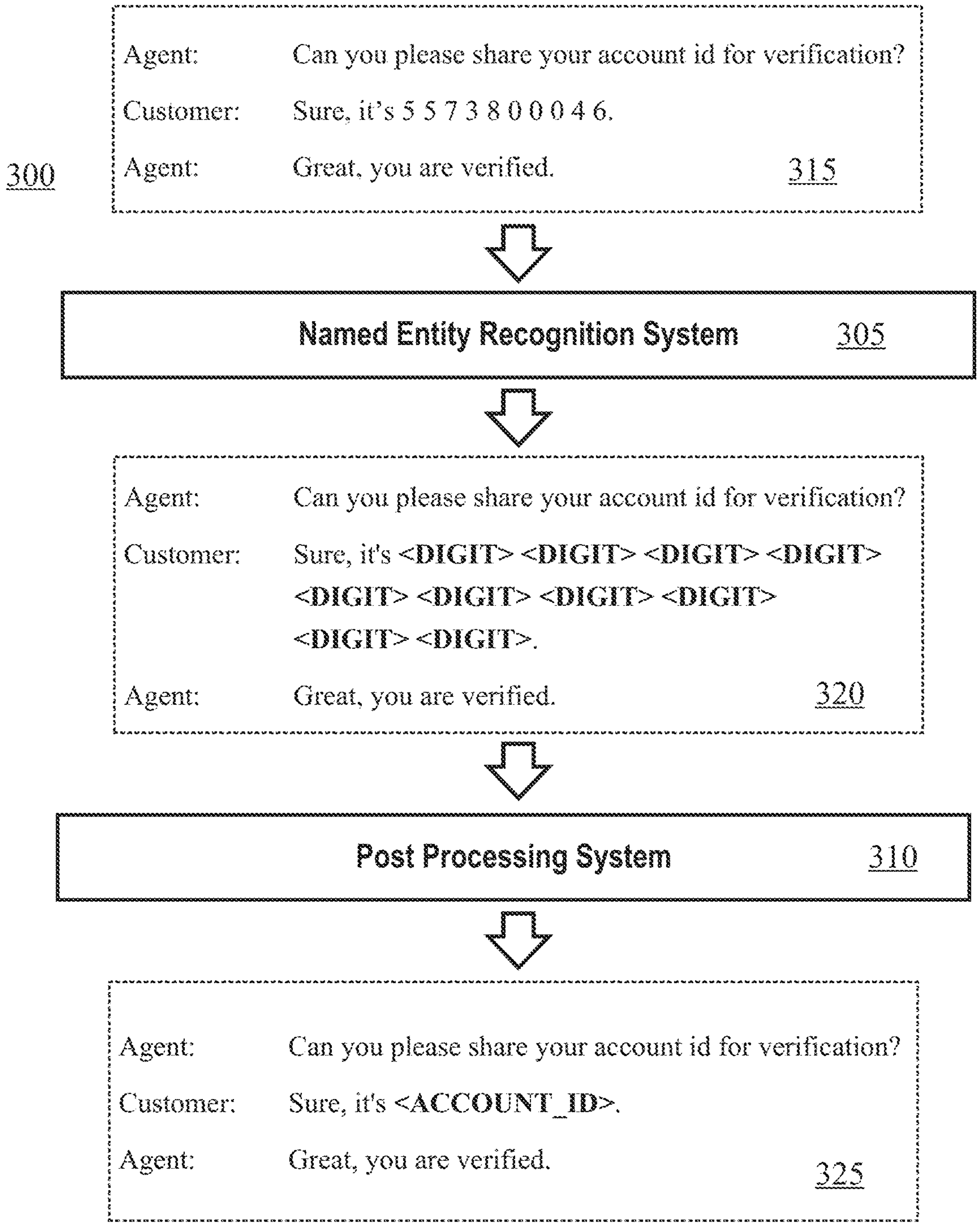
FIG. 3 depicts an exemplary process flow diagram showing a method of the present invention in accordance with a keyword lookup trigger.

With reference now to FIG. 3, an exemplary flow process 300 is provided showing a method of the present invention. The process 300 includes a conventional Named Entity Recognition System 305 as well as a Post Processing System 310. The Post Processing System 310 represents functionality associated with the present invention, which may include steps involving searching, triggering a lookup process, executing the lookup process, and masking pursuant to the parameters described above that define one or more new entity types. In this case, an exemplary new entity type "ACCOUNT_ID" is provided. The process 300 begins by receiving the conversational script 315, which is derived from an agent-customer conversation, for input to the Named Entity Recognition System 305. As shown, the conversation transcript 315 includes the following three turns:

Agent: Can you please share your account id for verification?

Customer: Sure, it's 5 5 7 3 8 0 0 0 4 6.

Agent: Great, you are verified.

The conversational transcript 315 then is provided as an input to the Named Entity Recognition System 305, which initially processes it using a NER model trained per the list of entity types introduced above. After the initial processing, the conversation transcript may be transformed into an edited conversational transcript 320, which is shown as the output from the Named Entity Recognition System 305. As the "ACCOUNT_ID" entity type is a new entity type, the NER model has not been trained on it and does not recognize it. Thus, while in the edited conversational transcript 320 the Named Entity Recognition System 305 recognizes the several digits as an entity, it can only replace the digits with a generic masking label, which is shown as the repeating "DIGIT":

Agent: Can you please share your account id for verification?

Customer: Sure, it's<DIGIT><DIGIT><DIGIT><DIGIT><DIGIT><DIGIT><DIGIT><DIGIT><DIGIT><DIGIT>.

Agent: Great, you are verified.

The output of the Named Entity Recognition System 305 is then provided as an input to the Post Processing System 310, which provides further processing in accordance with the parameters defining the new entity type "ACCOUNT_ID". The results are provided in a post processed conversational script 325 as follows:

Agent: Can you please share your account id for verification?

Customer: Sure, it's<ACCOUNT_ID>.

Agent: Great, you are verified.

As will be appreciated, the result shown in the post processed conversational script 325 can be efficiently achieved based on the following parameters values associated with the new entity type "ACCOUNT_ID". First, the lookup trigger parameter specifies a keyword lookup trigger. Second, the keyword trigger parameter specifies "account id" as one of the keywords. Other variations may also be provided as keywords. Third, the lookup-entity parameter specifies "DIGIT" as the selected generic entity type. And fourth, the entity name parameter specifies "ACCOUNT_ID" as the name of the new entity type for use in replacing the selected generic entity type once appropriately detected. Thus, in arriving at the result, the conversation script was searched for the keyword "account id." Then, once the keyword is detected, the conversation script searched for "DIGIT". As long as "DIGIT" appears in the conversation script in a way that satisfies all applicable search parameters (such as search parameters defining a search range in number of turns, whether those turns are measured forward and/or backward, which participant states the keyword, etc.), then the repeating "DIGIT" will be replaced with the name of the new entity type, as indicated. Note that, in this case, the number of lookup-entity parameter may have been used to specify "DIGIT" need to repeat 10 times for detection to occur. The use of this parameter may be used in cases similar to the exemplary new entity type "ACCOUNT_ID", as it is known to be a 10 digit number. As part of the lookup process, it is verified that the lookup-entity (which is "DIGIT") is sequentially repeated 10 times before it is deemed to have been for purposes of then masking it.

Figure 4:
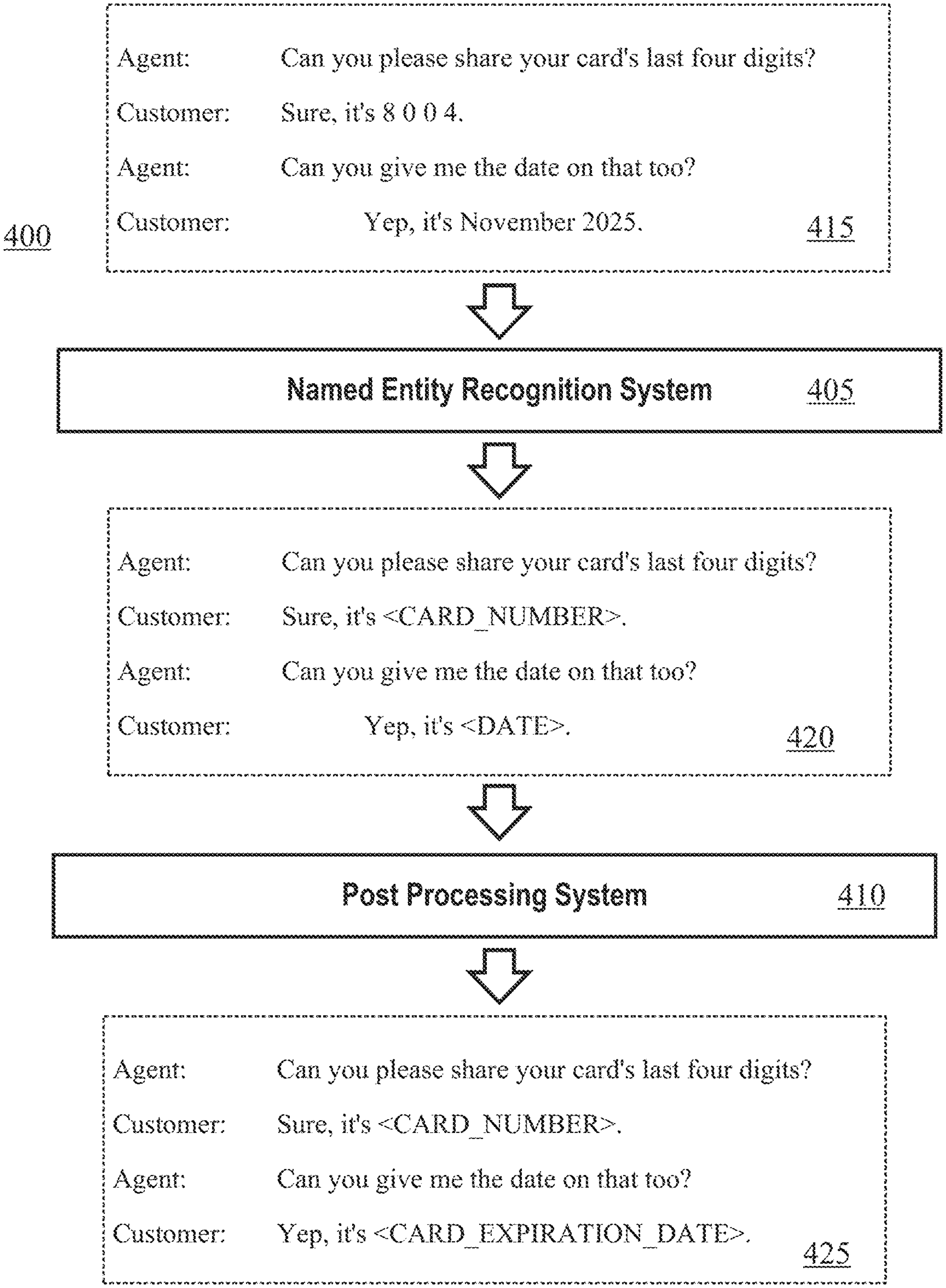
FIG. 4 depicts an exemplary process flow diagram showing a method of the present invention in accordance with an entity lookup trigger.

With reference now to FIG. 4, an exemplary flow process 400 is provided showing a method of the present invention. Like in FIG. 3, the process 400 includes a conventional Named Entity Recognition System 405 as well as a Post Processing System 410. The Post Processing System 310 represents functionality associated with the present invention, which may include steps involving searching, triggering a lookup process, executing the lookup process, and masking pursuant to the parameters described above that define one or more new entity types. In this case, an exemplary new entity type "CARD_EXPIRATION_DATE" is provided. The process 400 begins by receiving the conversational script 415, which is derived from an agent-customer conversation, for input to the Named Entity Recognition System 405. As shown, the conversation transcript 415 includes the following four turns:

Agent: Can you please share your card's last four digits?

Customer: Sure, it's 8 0 0 4.

Agent: Can you give me the date on that too?

Customer: Yep, it's November 2025.

The conversational transcript 415 then is provided as an input to the Named Entity Recognition System 405, which initially processes it using a NER model trained per the list of entity types introduced above. After the initial processing, the conversation transcript may be transformed into an edited conversational transcript 420, which is shown as the output from the Named Entity Recognition System 405. As the "CARD_EXPIRATION_DATE" entity type is a new entity type, the NER model has not been trained on it and does not recognize it. Thus, while in the edited conversational transcript 420 the Named Entity Recognition System 405 recognizes the several digits as an entity, it can only replace the digits with a generic masking label of "DATE":

Agent: Can you please share your card's last four digits?

Customer: Sure, it's<CARD_NUMBER>.

Agent: Can you give me the date on that too?

Customer: Yep, it's<DATE>.

The output of the Named Entity Recognition System 405 is then provided as an input to the Post Processing System 410, which provides further processing in accordance with the parameters defining the new entity type "CARD_EXPIRATION_DATE". The results are provided in a post processed conversational script 425 as follows:

Agent: Can you please share your card's last four digits?

Customer: Sure, it's<CARD_NUMBER>.

Agent: Can you give me the date on that too?

Customer: Yep, it's<CARD_EXPIRATION_DATE>.

As will be appreciated, the result shown in the post processed conversational script 425 can be efficiently achieved based on the following parameters values associated with the new entity type "CARD_EXPIRATION_DATE". First, the lookup trigger parameter specifies an entity lookup trigger. Second, the entity trigger parameter specifies "CARD_NUMBER" as the selected specific entity type. Third, the lookup-entity parameter specifies "DATE" as the selected generic entity type. And fourth, the entity name parameter specifies "CARD_EXPIRATION_DATE" as the name of the new entity type for use in replacing the selected generic entity type once appropriately detected. Thus, in arriving at the result, the conversation script was searched for the entity trigger parameter specified as "CARD_NUMBER". Once this is detected and triggers a lookup process, the lookup-entity parameter specifies "DATE" as the selected generic entity type. Upon finding "DATE" in executing the lookup process, the process can then proceed with revising the masking of the date with the entity name of the new entity type. Again, for this to happen, "DATE" must have been found in an area of the conversation transcript that is consistent with all specified search parameters. In this case, the new entity type is one that specifies a particular type of "DATE", which in this case is a card expiration date with a given entity name of "CARD_EXPIRATION_DATE". This is used to replace "DATE" so to arrive at the post processed conversational script 425.

As demonstrated in each of these examples, the functionality of the present invention provides a way for efficiently adding new entity types for tagging and masking conversation transcripts so that more precise and accurately labeled results are achieved. As shown, in the first example, a lookup process was triggered by a keyword lookup trigger, which resulted in a string of generic digits being more accurately identified and masked as the new entity type "ACCOUNT_ID". In the second example, a lookup process was triggered by an entity lookup trigger, which resulted in a generic date being more accurately identified and masked as the new entity type "CARD_EXPIRATION_DATE".

Figure 5:
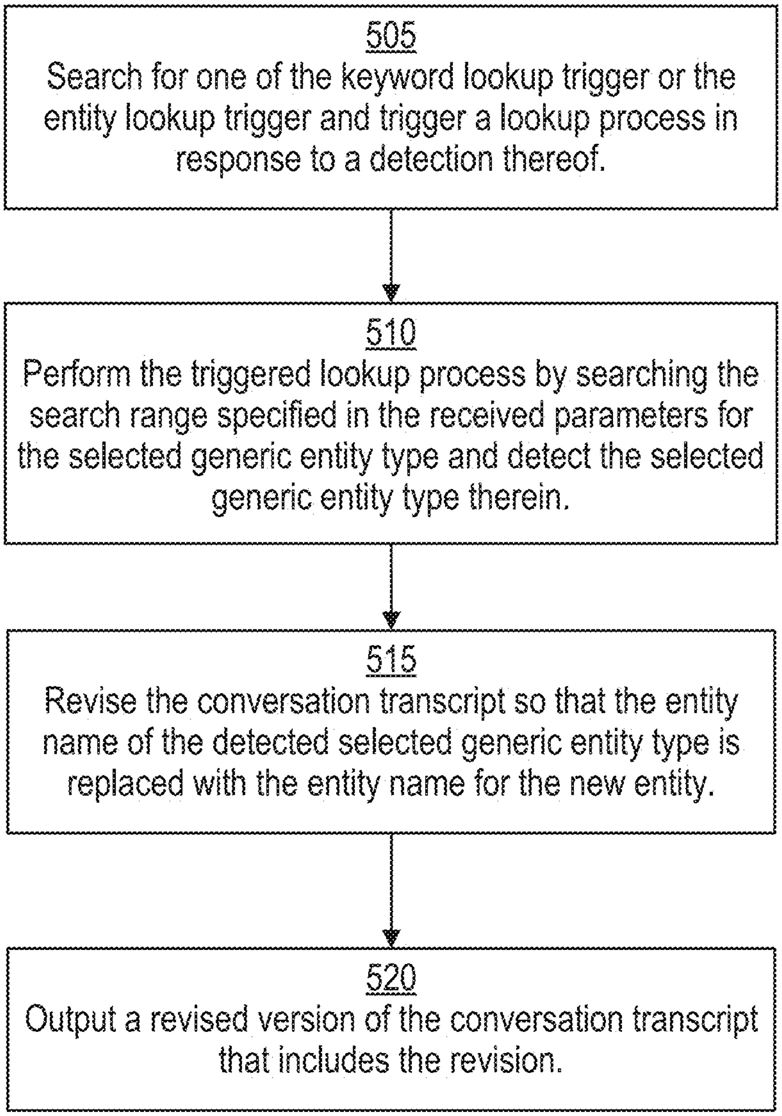
FIG. 5 depicts an exemplary method of the present invention.

With reference now to FIG. 5, an exemplary method 500 is shown for extending a tagging and masking of recognized entities in a conversation transcript to cover new entity types. The method 500 may include initial steps that are not depicted. For example, one initial step may include receiving a transcript from a conversation between participants that has been processed such that actual entities recognized therein have been replaced with respective entity names. Each entity name may be associated with an entity type. The entity types may include both specific entity types and generic entity types. Another initial step may include receiving parameters defining a new entity type. The parameters may include: a lookup trigger parameter that specifies whether a lookup trigger for triggering a lookup process comprises a keyword lookup trigger or an entity lookup trigger; a keyword trigger parameter that, when the lookup trigger comprises the keyword lookup trigger, specifies one or more keywords that, when detected in the conversation transcript, triggers the lookup process; an entity trigger parameter that, when the lookup trigger comprises the entity lookup trigger, specifies a selected one of the specific entity types, which hereinafter is referred to as a selected specific entity type, that, when detected in the conversation transcript, triggers the lookup process; a lookup-entity parameter that specifies selected one of the generic entity types, which is hereafter referred to as a selected generic entity type, that, is searched for in the conversation transcript in response to the triggering of the lookup process; one or more search parameters that specify a search range within the conversation transcript for conducting the search for the selected generic entity type in performance of the lookup process; and an entity name parameter that specifies an entity name for the new entity type that is used to replace the selected generic entity type when detected during the lookup process.

The method 500 may include steps associated with a first process that is performed in relation to the received conversation transcript in accordance with the received parameters defining the new entity type. The method 500 may begin at step 505 by searching for one of the keyword lookup trigger or the entity lookup trigger and triggering a lookup process in response to a detection thereof. The method 500 may continue at step 510 by performing the triggered lookup process by searching the search range specified in the received parameters for the selected generic entity type and detecting the selected generic entity type therein. The method 500 may continue at step 515 by revising the conversation transcript so that the entity name of the detected selected generic entity type is replaced with the entity name for the new entity type. The method 500 may continue at step 520 by outputting a revised version of the conversation transcript that includes the revision. In other embodiments, the other parameters, including the search parameters, may also be included. In certain embodiments, the conversation script may consist of text derived from a conversation between an agent in a contact center and a customer. In certain embodiments, the received parameters are provided via input from a user. Further, the received conversation transcript may be a conversation transcript that was first processed by a machine learning model trained for Named Entity Recognition. In accordance with exemplary embodiments, the output of the revised version of the conversation transcript may be transmitted to a downstream process that requires specific labeling of types of Personal Identifiable Information for limiting access thereto.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A method of extending a tagging and masking of recognized entities in a conversation transcript to cover new entity types, the method comprising the steps of:

receiving a transcript from a conversation between participants that has been processed such that actual entities recognized therein have been replaced with respective entity names, each entity name being associated with an entity type, wherein the entity types include both specific entity types and generic entity types;

receiving parameters defining a new entity type, the parameters comprising:

a lookup trigger parameter that specifies whether a lookup trigger for triggering a lookup process comprises a keyword lookup trigger or an entity lookup trigger;

a keyword trigger parameter that, when the lookup trigger comprises the keyword lookup trigger, specifies one or more keywords that, when detected in the conversation transcript, triggers the lookup process;

an entity trigger parameter that, when the lookup trigger comprises the entity lookup trigger, specifies a selected one of the specific entity types, which hereinafter is referred to as a selected specific entity type, that, when detected in the conversation transcript, triggers the lookup process;

a lookup-entity parameter that specifies selected one of the generic entity types, which is hereafter referred to as a selected generic entity type, that, is searched for in the conversation transcript in response to the triggering of the lookup process;

one or more search parameters that specify a search range within the conversation transcript for conducting the search for the selected generic entity type in performance of the lookup process;

an entity name parameter that specifies an entity name for the new entity type that is used to replace the selected generic entity type when detected during the lookup process;

performing a first process in relation to the received conversation transcript in accordance with the received parameters defining the new entity type that includes:

searching for one of the keyword lookup trigger or the entity lookup trigger and triggering a lookup process in response to a detection thereof;

performing the triggered lookup process by searching the search range specified in the received parameters for the selected generic entity type and detecting the selected generic entity type therein;

revising the conversation transcript so that the entity name of the detected selected generic entity type is replaced with the entity name for the new entity type; and outputting a revised version of the conversation transcript that includes the revision.

2. The method of claim 1, wherein the conversation script comprises text derived from a conversation between an agent in a contact center and a customer; and wherein the new entity type comprises Personal Identifiable Information.

3. The method of claim 2, wherein the one or more search parameters comprise a participant parameter that specifies one or more of the participants of the conversation transcript for limiting the triggering of the lookup process to only instances when the detected lookup trigger is found in a turn associated with the specified one or more participants.

4. The method of claim 2, wherein the one or more search parameters comprise a number of turns parameter that specifies a number of turns that the search is limited to in the lookup, with the number of turns being measured consecutively from the turn in which the lookup trigger is detected.

5. The method of claim 4, wherein the one or more search parameters comprises a forward/backward search parameter that specifies whether the number of turns of the number of turns parameter is measured forward, backward, or both forward and backward in the conversation transcript relative to the turn in which the lookup trigger is detected.

6. The method of claim 2, wherein the received parameters further comprises a number of lookup-entity parameter that specifies a number of times that the selected generic entity type must repeat sequentially before the lookup entity is deemed to be detected when performing the lookup process.

7. The method of claim 2, wherein the one or more search parameters comprise:

a participant parameter that specifies one or more of the participants of the conversation transcript for limiting the triggering of the lookup process to only instances when the detected lookup trigger is found in a turn associated with the specified one or more participants;

a number of turns parameter that specifies a number of turns that the search is limited to in the lookup, with the number of turns being measured consecutively from the turn in which the lookup trigger is detected; and a forward/backward search parameter that specifies whether the number of turns of the number of turns parameter is measured forward, backward, or both forward and backward in the conversation transcript relative to the turn in which the lookup trigger is detected.

8. The method of claim 7, wherein the received parameters further comprises a number of lookup-entity parameter that specifies a number of times that the selected generic entity type must repeat sequentially before the lookup entity is deemed to be detected when performing the lookup process.

9. The method of claim 2, wherein the received parameters comprise input received from a user; and wherein the output of the revised version of the conversation transcript is transmitted to a downstream process that requires specific labeling of types of Personal Identifiable Information for limiting access thereto.

10. The method of claim 2, wherein the received conversation transcript comprises a conversation transcript that was processed by a machine learning model trained for Named Entity Recognition.

11. A system for extending a tagging and masking of recognized entities in a conversation transcript to cover new entity types, the system comprising:

a processor; and a memory storing instructions which, when executed by the processor, cause the processor to perform the steps of:

receiving a transcript from a conversation between participants that has been processed such that actual entities recognized therein have been replaced with respective entity names, each entity name being associated with an entity type, wherein the entity types include both specific entity types and generic entity types;

receiving parameters defining a new entity type, the parameters comprising:

a lookup trigger parameter that specifies whether a lookup trigger for triggering a lookup process comprises a keyword lookup trigger or an entity lookup trigger;

a keyword trigger parameter that, when the lookup trigger comprises the keyword lookup trigger, specifies one or more keywords that, when detected in the conversation transcript, triggers the lookup process;

an entity trigger parameter that, when the lookup trigger comprises the entity lookup trigger, specifies a selected one of the specific entity types, which hereinafter is referred to as a selected specific entity type, that, when detected in the conversation transcript, triggers the lookup process;

a lookup-entity parameter that specifies selected one of the generic entity types, which is hereafter referred to as a selected generic entity type, that, is searched for in the conversation transcript in response to the triggering of the lookup process;

one or more search parameters that specify a search range within the conversation transcript for conducting the search for the selected generic entity type in performance of the lookup process;

an entity name parameter that specifies an entity name for the new entity type that is used to replace the selected generic entity type when detected during the lookup process;

performing a first process in relation to the received conversation transcript in accordance with the received parameters defining the new entity type that includes:

searching for one of the keyword lookup trigger or the entity lookup trigger and triggering a lookup process in response to a detection thereof, performing the triggered lookup process by searching the search range specified in the received parameters for the selected generic entity type and detecting the selected generic entity type therein;

revising the conversation transcript so that the entity name of the detected selected generic entity type is replaced with the entity name for the new entity type; and outputting a revised version of the conversation transcript that includes the revision.

12. The system of claim 11, wherein the conversation script comprises text derived from a conversation between an agent in a contact center and a customer; and wherein the new entity type comprises Personal Identifiable Information.

13. The system of claim 12, wherein the one or more search parameters comprise a participant parameter that specifies one or more of the participants of the conversation transcript for limiting the triggering of the lookup process to only instances when the detected lookup trigger is found in a turn associated with the specified one or more participants.

14. The system of claim 12, wherein the one or more search parameters comprise a number of turns parameter that specifies a number of turns that the search is limited to in the lookup, with the number of turns being measured consecutively from the turn in which the lookup trigger is detected.

15. The system of claim 14, wherein the one or more search parameters comprises a forward/backward search parameter that specifies whether the number of turns of the number of turns parameter is measured forward, backward, or both forward and backward in the conversation transcript relative to the turn in which the lookup trigger is detected.

16. The system of claim 12, wherein the received parameters further comprises a number of lookup-entity parameter that specifies a number of times that the selected generic entity type must repeat sequentially before the lookup entity is deemed to be detected when performing the lookup process.

17. The system of claim 12, wherein the one or more search parameters comprise:

a participant parameter that specifies one or more of the participants of the conversation transcript for limiting the triggering of the lookup process to only instances when the detected lookup trigger is found in a turn associated with the specified one or more participants;

a number of turns parameter that specifies a number of turns that the search is limited to in the lookup, with the number of turns being measured consecutively from the turn in which the lookup trigger is detected; and a forward/backward search parameter that specifies whether the number of turns of the number of turns parameter is measured forward, backward, or both forward and backward in the conversation transcript relative to the turn in which the lookup trigger is detected.

18. The system of claim 17, wherein the received parameters further comprises a number of lookup-entity parameter that specifies a number of times that the selected generic entity type must repeat sequentially before the lookup entity is deemed to be detected when performing the lookup process.

19. The system of claim 12, wherein the received parameters comprise input received from a user; and wherein the output of the revised version of the conversation transcript is transmitted to a downstream process that requires specific labeling of types of Personal Identifiable Information for limiting access thereto.

20. The system of claim 12, wherein the received conversation transcript comprises a conversation transcript that was processed by a machine learning model trained for Named Entity Recognition.

* * * * *